Aug. 14, 1951
H. RUMSEY, JR
2,564,611
HEAT SEALING APPARATUS
Filed March 30, 1949
2 Sheets-Sheet 1
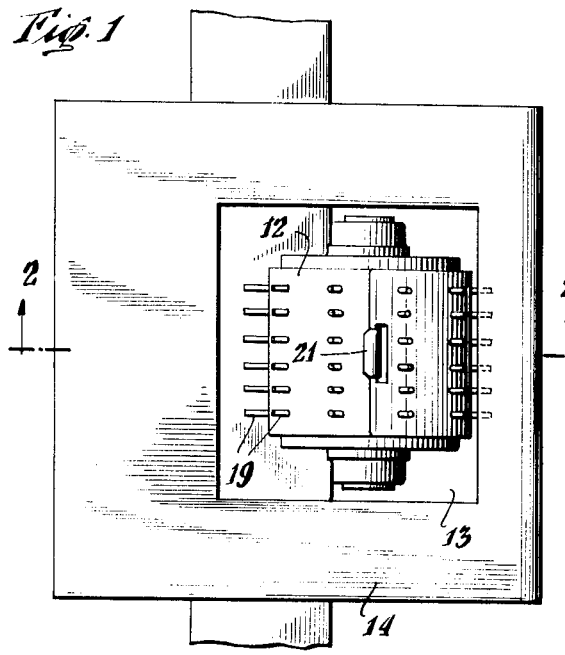
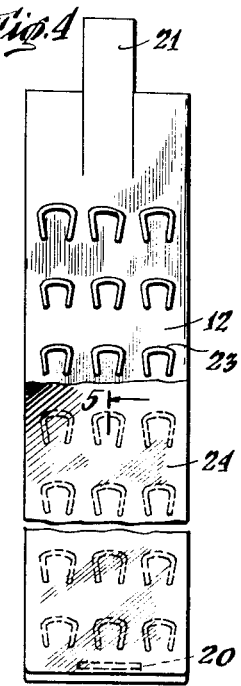
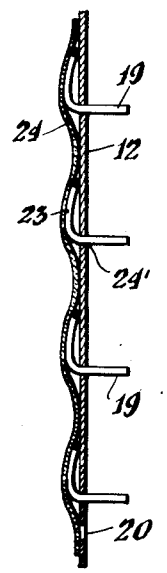
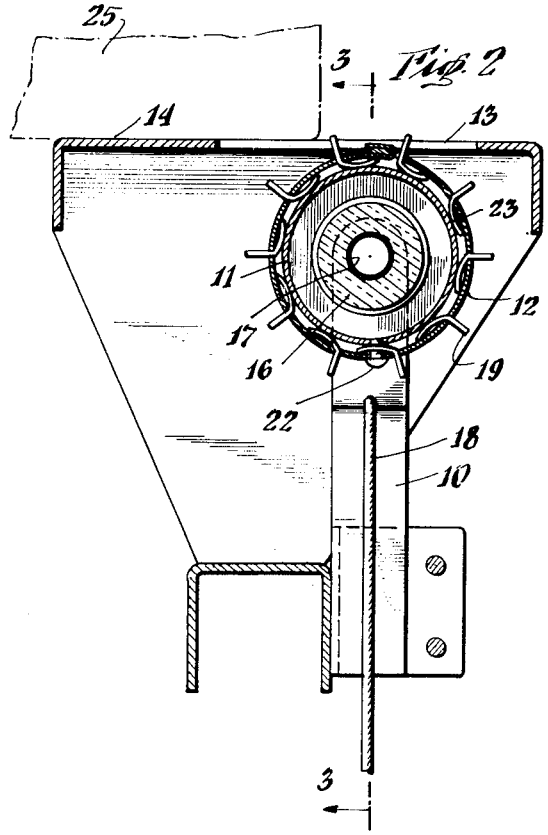
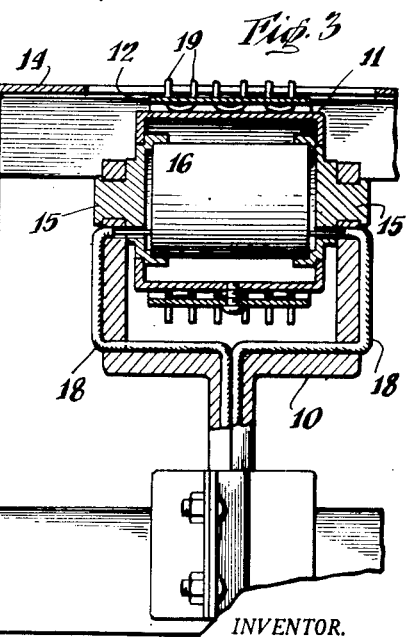
INVENTOR.
Herbert Rumsey, Jr.
BY
ATTORNEYS

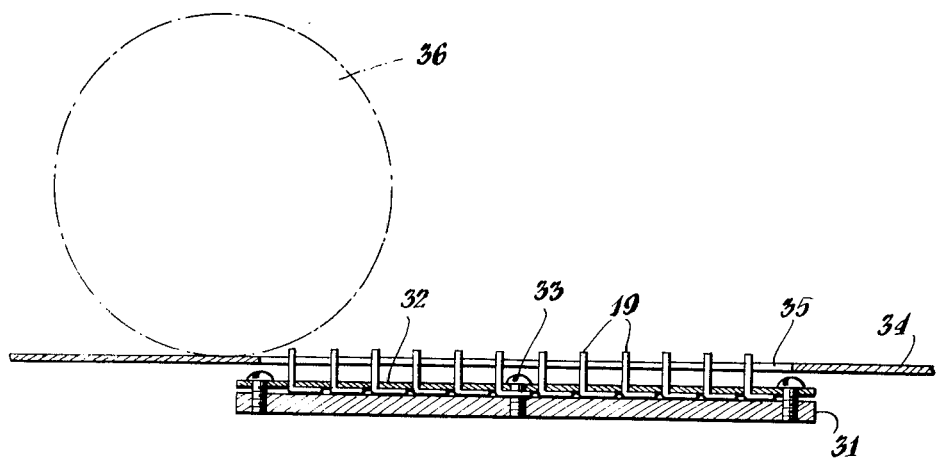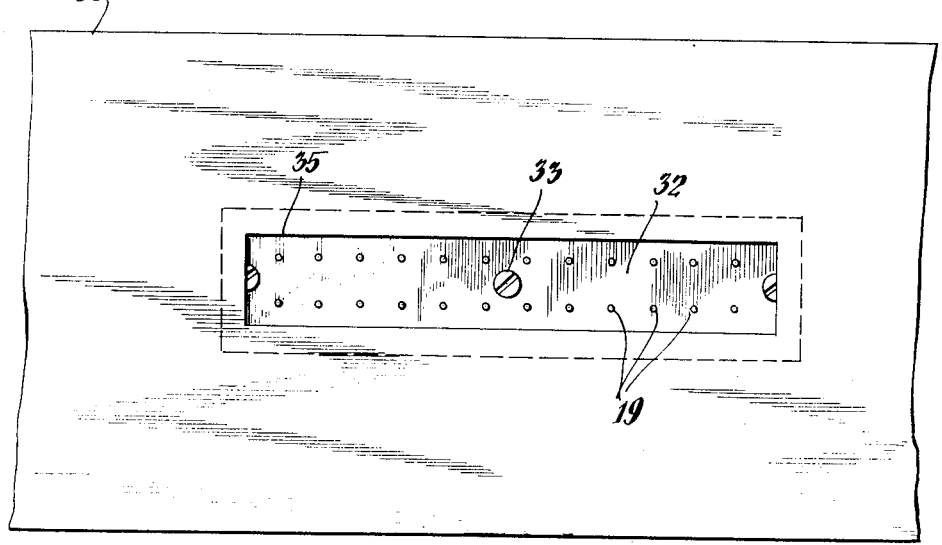

Patented Aug. 14, 1951

2,564,611

UNITED STATES PATENT OFFICE 2,564,611

HEAT SEALING APPARATUS

Herbert Rumsey, Jr., Rochester, N. Y.

Application March 30, 1949, Serial No. 84,297

1 Claim. (Cl. 154—42)

This invention relates to improved heat sealing apparatus.

It is an object of my invention to provide improved apparatus for heat sealing thermoplastic sheet material or film in the manner taught in my patent application Serial No. 37,978, filed July 10, 1948, now Patent No. 2,545,243, for Package Encased in Plastic Sheet Material and Method of Making the Same.

I have found that thermoplastic sheet material or film can be sealed together by arranging layers of the film in overlapping relationship and thereafter fusing the film at spaced points so as to provide spaced apertures with their edges fused or sealed together. In modern commercial packaging, the transparent, thermoplastic, wrapping or casing of the package can be conveniently secured in this manner.

It is an object of the present invention to provide improved apparatus for heat sealing thermoplastic material in this manner which is of inexpensive construction, which is simple to manufacture and to use, which can be used by relatively unskilled operators and in which the wearing parts can be readily replaced when desired.

In the accompanying drawings—

Fig. 1 is a top plan view of apparatus embodying my invention;

Fig. 2 is a sectional view in the direction of the arrows on the line 2—2 of Fig. 1;

Fig. 3 is a sectional view in the direction of the arrows on the line 3—3 of Fig. 2;

Fig. 4 is a bottom plan view of the replaceable prong supporting plate used in my apparatus;

Fig. 5 is a sectional view in the direction of the arrows on the line 5—5 of Fig. 4;

Fig. 6 is a side view partially in section, of a modified form of apparatus embodying my invention; and Fig. 7 is a top plan view of the apparatus.

My improved heat sealing apparatus consists primarily of a heating element, a prong supporting plate mounted in close proximity thereto and a working surface spaced outwardly from the prong supporting plate but arranged so that the prongs project outwardly through an opening therein. Thus, the working surface protects the wrapping material from the prong supporting plate and, at the same time, the prongs serve as the fusing or heating points for fusing the plastic material at spaced points.

Referring now to the first form of my invention shown in Figs. 1–5 it will be seen that I have provided a rotary type of heat sealing apparatus consisting of a supporting frame 10, a cylinder 11 mounted for rotary movement and carrying the prong supporting plate 12 so that the surface is spaced from the platen 14 with the upper end of the prongs projecting outwardly through the opening 13 formed therein.

The frame 10 is of bifurcated construction and fixedly supports the hub members 15 which, in turn, carry the cylindrical porcelain heating unit 16 having the resistance wires or heating elements 17 embedded therein. The two ends of the resistance wires are connected by leads 18 to a suitable source of electric current. The cylinder 11 is rotatably mounted on the hub members 15 and carries the prong supporting plate 12 from which the prongs 19 project in a radial direction.

The prong supporting plate is preferably made so as to be readily replaceable. Thus, as shown, the plate 12 is preferably made in the form of a flat metallic strip as shown in Figs. 4 and 5. At one end it is provided with a slotted opening 20 which is adapted to receive the tab-like projection 21 formed at the opposite end thereof. The strip or plate 12 is of such a length that it can be wound around the cylinder 11 as shown and the tab 21 can then be inserted through the slotted opening 20 and bent downwardly against the surface of the plate as appears from Figs. 1 and 2 thereby firmly holding the prong retainer and prongs in place. The strip or prong supporting plate 12 is also preferably held in place by a small screw 22 which is threaded through the plate and the cylinder 11, as appears from Figs. 2 and 3.

Prongs 19 are preferably of a type which can be readily assembled in the plate and can be replaced if necessary. Thus, as shown, they are preferably in the form of U-shaped members in which the connected portion or bail 23 is folded over at a sharp angle to the prongs 19 and forms a backing which rests against the back surface of plate 12. The prongs are inserted through apertures 24 in the plate with the bail or connected portion 23 resting against the back, as shown. The apertures in the plate 12 are arranged so that the prongs are in closely spaced relationship as shown.

When the prongs have been thus assembled with the plate they may be temporarily held in place in the flat strip by means of a strip of cellophane, adhesive coated such as Scotch tape, or other suitable material as shown at 24. When the plate has been assembled around the cylinder 11 and heat applied thereto the temporary retaining material 24 will disintegrate and disappear.

The platen 14 is so disposed with respect to the cylinder that the upper working surface of the platen is positioned in a plane spaced above the outer surface of the prong supporting strip 12. However, the prongs 19 project upwardly through aperture 13 to a plane above the surface of platen 14. This arrangement is most clearly shown in Figs. 2 and 3.

The prongs 19 should be arranged and formed so that the ends thereof project outwardly to substantially the same heighth.

The apparatus is used for sealing or securing the overlapping layers of thermoplastic sheet material or film as taught in my aforesaid copending patent application Serial No. 37,978. In this connection a package such as that illustrated in dotted lines at 25 in Fig. 2 is wrapped in thermoplastic sheet material such as cellulose acetate, rubber hydrochloride available commercially under the trade-mark "Pliofilm" or polyvinyl resin, for instance, "Saran." The package is then placed upon the platen 14 and shifted across the opening 13 with the overlapping layers of the sheet material in contact with the prongs of the roller. The heating element 17 has, of course, been connected to a source of electric current which is so controlled that the outer ends of the prongs are heated primarily by radiation from the porcelain heating unit 16 and the heating element 17 to a temperature above the fusing temperature of the thermoplastic heating material. The package 25 is then shifted to the right as viewed in Fig. 2 and the contact between the prongs and the package cause the roller to rotate in a clockwise direction. The prongs engage the sheet material and fuse or melt it at a plurality of spaced points which upon cooling are fused or sealed around the peripheral edges as taught in my aforesaid copending application.

Due to the fact that the platen 14 is positioned in a plane spaced above the surface or periphery of the prong supporting plate 12 the sheet material or package will not engage the plate 12. This, of course, is desirable since if the thermoplastic material contacted the plate, the heat thereof would cause it to disintegrate.

In Figs. 6 and 7 I have illustrated a modified type of apparatus in which the prongs and prong supporting plate are stationary and the contact between the prongs and thermoplastic material is obtained by rolling or rotating the package over the prongs.

In this form of apparatus I provide a flat heating element 31 which also serves as a backing strip for the prong supporting plate and prongs. The prong supporting plate 32 is likewise flat and resembles the plate 12 (when in strip form as shown in Figs. 4 and 5) except that the slotted opening 20 and tab 21 may be omitted.

Prongs 19, identical in construction with the prongs shown in the first form of my invention, are supported on the prong supporting plate 32 in the same fashion as in the first form of my invention. The prong supporting plate 32 is held in place on the heating element and backing strip 31 by suitable means such as the screws 33.

A platen 34 providing a working surface is mounted above the heating unit and prong supporting plate so that the working surface is in a plane spaced above the prong supporting plate but so that the prongs 19 project upwardly through the opening 35 in the platen.

In using the devices the heating element 17 of the porcelain heating unit 16 is connected by suitable leads 18 to a source (not shown) of electric current and heated so that the prongs are elevated primarily by radiation from the heating unit 16 and the heating element 17 to a temperature above the heating point of the thermoplastic heating material to be sealed. A cylindrical or circular package such as that shown in dotted lines at 36 in Fig. 6 is wrapped in the thermoplastic material and then rotated over the platen so that the overlapping edges of the material contact the projecting prongs which fuses the material at spaced points causing apertures whose edges will seal or fuse upon cooling.

In both forms of my apparatus the prongs can be readily assembled with the prong supporting plate and the prongs can also be readily adjusted as to heighth so that a degree of uniformity can be obtained. The prong supporting plates in turn can be readily assembled with the apparatus and can also be readily replaced when desired. Also, on occasion individual pairs of prongs can be replaced. In using the apparatus relatively unskilled operators can be employed since the arrangement of the platen is such as to only permit contact between the packaging material and the prongs. In other words, the platen prevents direct contact between the prong supporting plate 12 and the packaging material which would damage or cause the disintegration thereof.

It will thus be seen that I have provided an improved heat sealing apparatus which is of inexpensive construction, which is simple to manufacture and use, which can be operated by relatively unskilled operators and in which the wearing parts can be readily replaced when desired. Modifications may, of course, be made in the illustrated and described embodiment without departing from my invention as set forth in the accompanying claim.

I claim:

Apparatus to be used in heat sealing thermoplastic sheet material comprising: a supporting structure; a cylinder mounted on said supporting structure for rotary motion; a plurality of radial prongs made of heat conducting material mounted on the cylinder and projecting outwardly from the periphery thereof; means for heating said cylinder and thereby said prongs; and a platen providing a working surface having an opening therein mounted on said supporting structure above said cylinder with the opening in alignment with the cylinder, the platen being arranged in a plane with the working surface above the plane of the periphery of the cylinder with the prongs projecting through the opening to a plane above the working surface.

HERBERT RUMSEY, JR.

REFERENCES CITED

The following references are of record in the file of this patent:

UNITED STATES PATENTS

| Number | Name | Date |
| --- | --- | --- |
| 241,997 | Kershaw et al. | May 24, 1881 |
| 2,002,079 | Dickie | May 21, 1935 |
| 2,004,041 | Driver | June 4, 1935 |
| 2,097,427 | Bergstein | Nov. 2, 1937 |
| 2,117,452 | Robinson | May 17, 1938 |
| 2,322,298 | Johnston | June 22, 1943 |